United States Patent [19]

Clem

[11] Patent Number: 4,664,955
[45] Date of Patent: May 12, 1987

[54] NATURAL STONE FACING COMPOSITE LAMINATE

[75] Inventor: Chesley D. Clem, Benton, Ky.

[73] Assignee: Swiss Aluminium Ltd., Chippis, Switzerland

[21] Appl. No.: 842,162

[22] Filed: Mar. 21, 1986

[51] Int. Cl.$^4$ .............................................. B44F 9/04
[52] U.S. Cl. .................... 428/15; 52/309.13; 156/61
[58] Field of Search ......... 156/61; 52/309.13; 428/15

[56] References Cited

U.S. PATENT DOCUMENTS

| | | | |
|---|---|---|---|
| 2,823,140 | 2/1958 | Lowell | 52/309.13 X |
| 2,859,530 | 11/1958 | Renaud | 52/309.13 X |
| 3,723,233 | 3/1973 | Bourke | 428/118 |
| 3,762,939 | 10/1973 | Hunter | 428/215 |
| 3,811,989 | 5/1974 | Hearn | 428/174 X |
| 3,902,732 | 9/1975 | Fosha, Jr. et al. | 428/116 X |
| 3,963,846 | 6/1976 | Bourke | 428/116 X |
| 4,020,207 | 4/1977 | Alfter et al. | 428/116 X |
| 4,235,948 | 11/1980 | Holmes | 428/15 |
| 4,446,177 | 5/1984 | Munoz et al. | 428/15 |
| 4,506,482 | 3/1985 | Pracht et al. | 52/235 |

Primary Examiner—Henry F. Epstein
Attorney, Agent, or Firm—Bachman & LaPointe

[57] ABSTRACT

A composite laminate for use in the paneling of walls, ceilings and other surfaces such as furniture and the like comprises a polymeric sheet-like core having a pair of surfaces to which are bonded a metal foil so as to form a sandwich-type structure and wherein a lamina of natural facing stone is uniformly bonded to at least one of the pair of metal foils.

13 Claims, 1 Drawing Figure

U.S. Patent     May 12, 1987     4,664,955
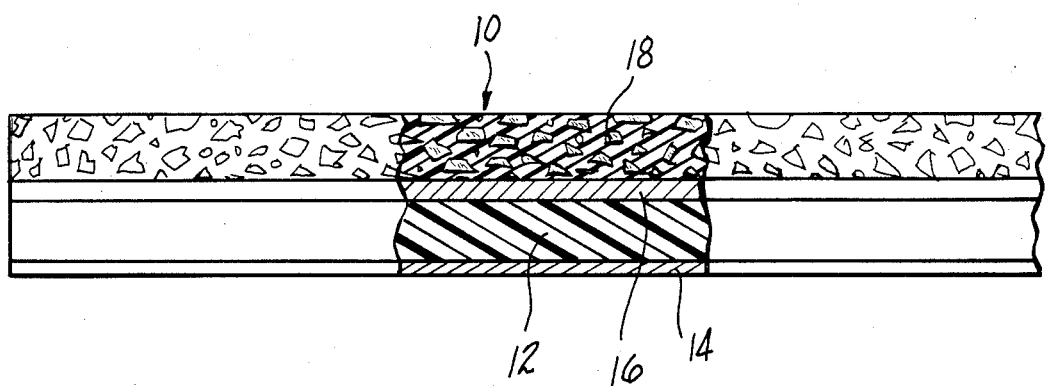

NATURAL STONE FACING COMPOSITE LAMINATE

BACKGROUND OF THE INVENTION

The present invention relates to a composite laminate for use in the paneling of walls, ceilings and other surfaces such as furniture and the like and, more particularly, a composite laminate having a lamina of natural facinq stone on the surface thereof.

Natural stone, such as marble and the like, is a highly desirable surface material due to its beauty, hardness and durability. Heretofore, use of natural stone as a facing material has been greatly limited due to reasons of expense and weight. In order to overcome the foregoing disadvantages, U.S. Pat. No. 3,723,233 disclosed the manufacture of a laminate comprising marble bonded to a metal honeycomb structure. While the laminate of the '233 patent was less expensive and lighter than using plain marble facing, the product was still quite expensive and heavy. U.S. Pat. No. 3,963,846 discloses an improvement over the '233 patent in that the multicellular metal core is replaced by a multicellular paper core which is considerably cheaper to produce than the metal core of the '233 patent. While the improved product of the '846 patent is inexpensive to manufacture relative to the product of the '233 patent, the product fails to exhibit the necessary strength and fire resistance for many construction applications.

Accordingly, it is the principal object of the present invention to provide an improved composite laminate having a lamina of natural facing stone.

It is a particular object of the present invention to provide a composite lamina which exhibits the necessary strength and fire resistance for construction purposes.

It is a still further object of the present invention to provide a composite lamina which is relatively inexpensive to manufacture.

Further objects and advantages of the present invention will appear hereinbelow.

SUMMARY OF THE INVENTION

In accordance with the present invention the foregoing objects and advantages are readily obtained.

The present invention resides in a composite laminate comprising a polymeric sheet-like core having a pair of surfaces and a pair of metal foils uniformly bonded to the pair of surfaces so as to form a sandwich-type structure. In accordance with a principal feature of the present invention a lamina of natural facing stone is uniformly bonded to at least one of the metal foils which form a sandwich-type structure with the polymeric core. The composite laminate of the present invention exhibits excellent strength properties and fire resistance.

The present invention also includes an improved process for manufacturing a composite laminate comprising the steps of forming the sandwich-type structure by bonding a pair of metal foils to a polymeric sheet-like core and thereafter roughening the exposed surfaces of the metal foils so as to remove any metal oxide coating and increase the bonding area on the metal foils. After the metal foils are roughened a slurry of naturally facing stone and a matrix material is poured on the exposed surface of the metal foils and smoothed. The slurry is thereafter cured in air so as to set the natural facing stone.

The composite laminate of the present invention and the process for manufacturing same offer considerable advantages over heretofore commercially available composite laminates.

BRIEF DESCRIPTION OF THE DRAWING

The FIGURE is a side elevation of one example of the composite laminate of the present invention.

DETAILED DESCRIPTION

With reference to the FIGURE, the composite laminate 10 of the present invention is illustrated and comprises a sandwich-type structure having a polymeric sheet-like core 12 having a pair of metal foils 14 and 16 uniformly bonded to the surfaces of the sheet-like core. In accordance with a particular feature of the present invention, a lamina natural facing stone 18 is uniformly bonded to at least one of the metal foils 14 and 16.

In accordance with the present invention the composite laminate of the present invention comprises a polymeric sheet-like core having a thickness of from about 0.078 to 0.236 inches, preferably 0.157 to 0.197 inches, laminated on both surfaces thereof with metal foils having a thickness of about between 0.015" to 0.040" preferably between 0.018" to 0.022" such that the total thickness of the sandwich-type structure is from about 0.093" to 0.258", preferably 0.175" to 0.219". A lamina of natural facing stone is bonded to at least one of the metal foils forming the sandwich-type structure. In accordance with the present invention the thickness of the lamina of natural facing stone is from about 0.062" to 0.250", preferably 0.125" to 0.187". In order to optimize the strength and weight characteristics of the composite laminate of the present invention, it is preferred that the ratio of thickness of the lamina of natural facing stone to the total thickness of the pair of metal foils be from about 2:1 to 4.25:1, preferably 3.125:1 to 3.5:1. In addition, the ratio of the thickness of the lamina of natural facing stone to the thickness of the sandwich-type structure is from about 1:1 to 1:1.5, preferably 1:1.17 to 1:1.40. In order to measure a relatively light structure of the composite laminate of the present invention, the ratio of the thickness of the polymeric sheet-like core to the thickness of each of the metal foils is from about 7.8:1 to 8.9:1, preferably 5.9:1 to 8.7:1.

The composite laminate of the present invention can be prepared in a number of convenient manners. The polymeric sheet-like core is secured to the metal foils using adhesives as for example epoxy resins and the like. The surfaces of the thermoplastic core material and/or the metal foil can be pretreated if desired mechanically, chemically, thermally and electrically in order to improve bonding. Suitable polymeric sheet-like cores include but are not limited to olefinic thermoplastic polymers such as polyethylene, polypropylene, copolymers and terpolymers thereof, as for example, copolymers of ethylene and ethyl acrylate; polyamides, polyhydroxyethers, vinyls and the like. In accordance with a particular feature of the present invention the exposed surface of the metal foils to which the natural facing stone is to be bonded is roughened as for example with a mechanical brush so as to remove any metal oxide coating and increase the bonding area. It is preferred that the roughened surface of the metal foils be roughened until vertical dimensions of $10\mu$ to $30\mu$ in peaks are obtained. A slurry comprising 70 to 80 percent by weight natural facing stone and 20 to 30% of a matrix material is prepared. Suitable matrix materials include polyesters and epoxys as well as acrylics. If desired the roughened metal surface may be primed with an acrylic primer to a thickness of between 0.0005 to 0.0015 inches and thereafter the slurry is poured onto the exposed and, if desired, primed surface of the metal foil and smoothed. The slurry may be smoothed by troweling or vibrating the sandwich-like structure. It is preferred that this operation take place under reduced pressure in a pressure range of less than ¾ atmospheric pressure in order to eliminate entrapped air in the slurry. The slurry is thereafter cured in air for about 18 to 24 hours at a humidity of from about 40% to 60% at a temperature of between 60° to 75° F. so as to set the matrix. Thereafter the laminate of natural facing stone can be polished to a high gloss.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A composite laminate comprising a polymeric sheet-like core having a pair of surfaces, a pair of metal foils uniformly bonded to said pair of surfaces of said polymeric sheet-like core so as to form a sandwich-type structure and a lamina comprising 70 to 80% of a natural facing stone and 20 to 30% of a matrix material uniformly bonded to at least one of said pair of metal foils.

2. A composite laminate according to claim 1 wherein the thickness of said polymeric sheet-like core is between 0.118 to 0.197 inches.

3. A composite laminate according to claim 2 wherein the thickness of each of said metal foils is between 0.019 to 0.020 inches.

4. A composite laminate according to claim 3 wherein the thickness of said lamina of natural facing stone is between 0.125 to 0.187 inches.

5. A composite laminate according to claim 4 wherein the ratio of the thickness of lamina of natural facing stone to the total thickness of said pair of metal foils is between 3:1 to 3.5:1.

6. A composite laminate according to claim 5 wherein the ratio of the thickness of lamina of natural facing stone to the thickness of said sandwich-type structure is between 1:1.2 to 1:1.4.

7. A composite laminate according to claim 5 wherein the ratio of the thickness of said polymeric sheet-like core to the thickness of each of said metal foils is between 6:1 to 8:1.

8. A composite laminate according to claim 7 wherein the ratio of the thickness of lamina of natural facing stone to the thickness of said sandwich-type structure is between 1:1.2 to 1:1.4.

9. A process for manufacturing a composite laminate comprising a polymeric sheet-like core having a pair of surfaces, a pair of metal foils uniformly bonded to said pair of surfaces of said polymeric sheet-like core so as to form a sandwich-type structure and a lamina of natural facing stone uniformly bonded to at least one of said pair of metal foils, comprising the steps of:
    (a) forming said sandwich-type structure by bonding said pair of metal foils to said pair of surfaces of said polymeric sheet-like core;
    (b) roughening the exposed surface of at least one of said pair of metal foils so as to remove any metal oxide coating and increase bonding area;
    (c) preparing a slurry comprising 70 to 80% natural facing stone and 20 to 30% of a matrix material selected from the group consisting of polyester, epoxy and or acrylics;
    (d) pouring and smoothing said slurry on said exposed surface of said at least one of said pair of metal foils; and
    (e) curing said poured and smoothed matrix in air so as to set same.

10. A process according to claim 9 including the steps of priming said exposed surface of said at least one of said pairs of metal foils with an acrylic primer to a thickness of between 0.0005 to 0.0015 inches prior to pouring and smoothing said slurry.

11. A process according to claim 9 including the steps of pouring and smoothing said slurry in a reduced pressure environment of less than ¾ atmospheric pressure.

12. A process according to claim 11 including the steps of curing said matrix in air at a temperature of between 60° to 75° F. at a humidity of between 40% to 60% for between 18 to 24 hours.

13. A composite laminate according to claim 1 wherein said matrix material is selected from the group consisting of polyester, epoxy, acrylics or mixtures thereof.

* * * * *